United States Patent
Hagihara et al.

(10) Patent No.: US 12,238,360 B2
(45) Date of Patent: Feb. 25, 2025

(54) INFORMATION PROCESSING DEVICE, INFORMATION PROCESSING METHOD, AND STORAGE MEDIUM

(71) Applicant: HONDA MOTOR CO., LTD., Tokyo (JP)

(72) Inventors: Tomoaki Hagihara, Tokyo (JP); Takashi Miyata, Tokyo (JP); Taiki Yamada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/125,845

(22) Filed: Mar. 24, 2023

(65) Prior Publication Data
US 2023/0319338 A1  Oct. 5, 2023

(30) Foreign Application Priority Data
Mar. 29, 2022  (JP) .................. 2022-053166

(51) Int. Cl.
  *H04N 21/41*  (2011.01)
  *H04N 21/414*  (2011.01)
  *H04N 21/458*  (2011.01)

(52) U.S. Cl.
  CPC ..... *H04N 21/41422* (2013.01); *H04N 21/458* (2013.01)

(58) Field of Classification Search
  CPC ........... H04N 21/41422; H04N 21/458; H04N 21/25891
  See application file for complete search history.

(56) References Cited

U.S. PATENT DOCUMENTS

| | | | |
|---|---|---|---|
| 2006/0116965 A1 | 6/2006 | Kudo et al. | |
| 2011/0029499 A1 | 2/2011 | Urushihara et al. | |
| 2011/0110530 A1* | 5/2011 | Kimura | G11B 27/34 715/825 |
| 2013/0311038 A1* | 11/2013 | Kim | G01C 21/3691 701/1 |
| 2015/0112512 A1* | 4/2015 | Fan | B60G 17/02 701/1 |

(Continued)

FOREIGN PATENT DOCUMENTS

| | | |
|---|---|---|
| CN | 111859113 | 10/2020 |
| JP | 2003-150681 | 5/2003 |

(Continued)

OTHER PUBLICATIONS

Japanese Office Action for Japanese Patent Application No. 2022-053166 mailed Jan. 9, 2024.

(Continued)

*Primary Examiner* — Timothy R Newlin
(74) *Attorney, Agent, or Firm* — Amin, Turocy & Watson, LLP (57) ABSTRACT

An information processing device of an embodiment includes a first acquisition unit that acquires first information of output content to be output by each of a plurality of shared moving objects used by a plurality of users, a providing unit that provides second information obtained by associating the first information with the shared moving object to a terminal device of the user, and a reception unit that receives an application for use of the shared moving object which is transmitted by the terminal device.

7 Claims, 10 Drawing Sheets

(56) References Cited

U.S. PATENT DOCUMENTS

| | | | |
|---|---|---|---|
| 2015/0135336 A1* | 5/2015 | Arasavelli | H04L 63/102 |
| | | | 726/29 |
| 2017/0323639 A1* | 11/2017 | Tzirkel-Hancock | ............... |
| | | | B60H 1/00757 |
| 2019/0197430 A1* | 6/2019 | Arditi | G06N 20/00 |
| 2019/0205812 A1* | 7/2019 | Afzal | H04L 67/12 |
| 2020/0356909 A1* | 11/2020 | Tan | G06Q 10/025 |
| 2022/0012313 A1* | 1/2022 | Miyahara | G06F 3/04883 |
| 2022/0318822 A1* | 10/2022 | Gupta | G06N 5/02 |

FOREIGN PATENT DOCUMENTS

| | | |
|---|---|---|
| JP | 2004-078640 | 3/2004 |
| JP | 2005-244776 | 9/2005 |
| JP | 2011-034394 | 2/2011 |
| JP | 2021-073467 | 5/2021 |
| WO | 2005/006199 | 1/2005 |

OTHER PUBLICATIONS

Japanese Office Action for Japanese Patent Application No. 2022-053166 mailed Apr. 2, 2024.
Japanese Office Action for Japanese Patent Application No. 2022-053166 mailed Jul. 30, 2024.

\* cited by examiner

| USER ID | NAME | AGE | SEX | OCCUPATION | GENRE | ARTIST | HOBBY |
|---|---|---|---|---|---|---|---|
| 0001 | ○○ | 24 | F | COMPANY EMPLOYEE | K-POP | ○○○○ | TRAVEL |
| 0002 | ○○ | 33 | M | INDEPENDENT BUSINESS | HIPHOP | ○○○○ | SPORT |
| 0003 | ○○ | 62 | F | INOCCUPATION | ENKA | ○○○○ | MOVIE |
| 0004 | ○○ | 18 | F | STUDENT | ANIMATION | ○○○○ | ANIMATION |

| CAR SHARING (RIDE SHARING, TAXI, BICYCLE SHARING, RENTAL CAR) ||||
|---|---|---|---|
| OPERATING COMPANY | MOVING OBJECT ID | STORAGE POSITION | PROVIDED MUSIC GENRE |

SHIP

COACH BUS

RAILROAD

| OPERATING COMPANY | OPERATION ID | MOVING OBJECT ID | MUSIC OUTPUT IN MOVING OBJECT |
|---|---|---|---|
| ○○ | ○○ | ○○ | K-POP |
| ○○ | ○○ | ○○ | HIPHOP |
| ○○ | ○○ | ○○ | ENKA |
| ○○ | ○○ | ○○ | ANIMATION |

| CAR SHARING (RIDE SHARING, TAXI, BICYCLE SHARING, RENTAL CAR) | | | |
|---|---|---|---|
| OPERATING COMPANY | VEHICLE ID | STORAGE POSITION | RESERVATION STATUS |

SHIP

COACH BUS

RAILROAD

| OPERATING COMPANY | OPERATION ID | MOVING OBJECT ID | DEPARTURE POINT | ARRIVAL POINT | TIMETABLE |
|---|---|---|---|---|---|
| ○○ | ○○ | ○○ | ○○ | ○○ | |
| ○○ | ○○ | ○○ | ○○ | ○○ | |
| ○○ | ○○ | ○○ | ○○ | ○○ | |
| ○○ | ○○ | ○○ | ○○ | ○○ | |

| RESERVATION ID | USER ID | MOVING OBJECT TYPE | MOVING OBJECT ID | DEPARTURE POINT | DESTINATION | DEPARTURE TIME | ARRIVAL TIME |
|---|---|---|---|---|---|---|---|
| 0001 | ○○ | ○○ | ○○ | ○○ | ○○ | ○○ | ○○ |
| 0002 | ○○ | ○○ | ○○ | ○○ | ○○ | ○○ | ○○ |
| 0003 | ○○ | ○○ | ○○ | ○○ | ○○ | ○○ | ○○ |
| 0004 | ○○ | ○○ | ○○ | ○○ | ○○ | ○○ | ○○ |

INFORMATION PROCESSING DEVICE, INFORMATION PROCESSING METHOD, AND STORAGE MEDIUM

CROSS-REFERENCE TO RELATED APPLICATION

This application is based upon and claims the benefit of priority from Japanese Patent Application No. 2022-053166, filed Mar. 29, 2022, the entire content of which is incorporated herein by reference.

BACKGROUND

Field of the Invention

The present invention relates to an information processing device, an information processing method, and a storage medium.

DESCRIPTION OF RELATED ART

In public transportation such as electric trains, there is a technique of playing back content such as music to entertain users. As such a technique, for example, there is a technique of estimating the time when a user will board an electric train which is public transportation and delivering viewable content during the estimated time of boarding (see, for example, Japanese Unexamined Patent Application, First Publication No. 2004-78640).

SUMMARY

However, even when a user receives delivery of viewable content, the delivered content may not suit the user's preference. In this case, even though the content is delivered, it may not be possible to sufficiently entertain the user.

The present invention was contrived in view of such circumstances, and one object thereof is to provide an information processing device, an information processing method, and a storage medium that make it possible to provide content adapted to a user's preference.

The following configurations are adopted in an information processing device, an information processing method, and a storage medium according to this invention.

(1) According to an aspect of the present invention, there is provided an information processing device including: a first acquisition unit that acquires first information of output content to be output by each of a plurality of shared moving objects used by a plurality of users; a providing unit that provides second information obtained by associating the first information with the shared moving object to a terminal device of the user; and a reception unit that receives an application for use of the shared moving object which is transmitted by the terminal device.

(2) In the aspect of the above (1), the device further includes: a second acquisition unit that acquires an action schedule of the user; and a third acquisition unit that acquires a movement schedule of the plurality of shared moving objects, and the providing unit provides the terminal device with the second information of the shared moving objects of which the movement schedule matches the action schedule of the user.

(3) In the aspect of the above (1), the device further includes a generation unit that generates third information for causing the terminal device to output specific output content which is related to output content to be output by the shared moving object used by the user and is different from the output content before the user uses the shared moving object, and the providing unit provides the third information to the terminal device.

(4) According to another aspect of the present invention, there is provided an information processing method including causing a computer to: acquire first information of output content to be output by each of a plurality of shared moving objects used by a plurality of users; provide second information obtained by associating the first information with the shared moving object to a terminal device of the user; and receive an application for use of the shared moving object which is transmitted by the terminal device.

(5) According to another aspect of the present invention, there is provided a non-transitory storage medium having computer-readable instructions stored therein for causing a computer to: acquire first information of output content to be output by each of a plurality of shared moving objects used by a plurality of users; provide second information obtained by associating the first information with the shared moving object to a terminal device of the user; and receive an application for use of the shared moving object which is transmitted by the terminal device.

According to any of the above aspects, it is possible to provide content adapted to a user's preference.

DESCRIPTION OF EMBODIMENTS

Hereinafter, an embodiment of information processing device, an information processing method, and a storage medium of the present invention will be described with reference to the accompanying drawings.

Figure 1:
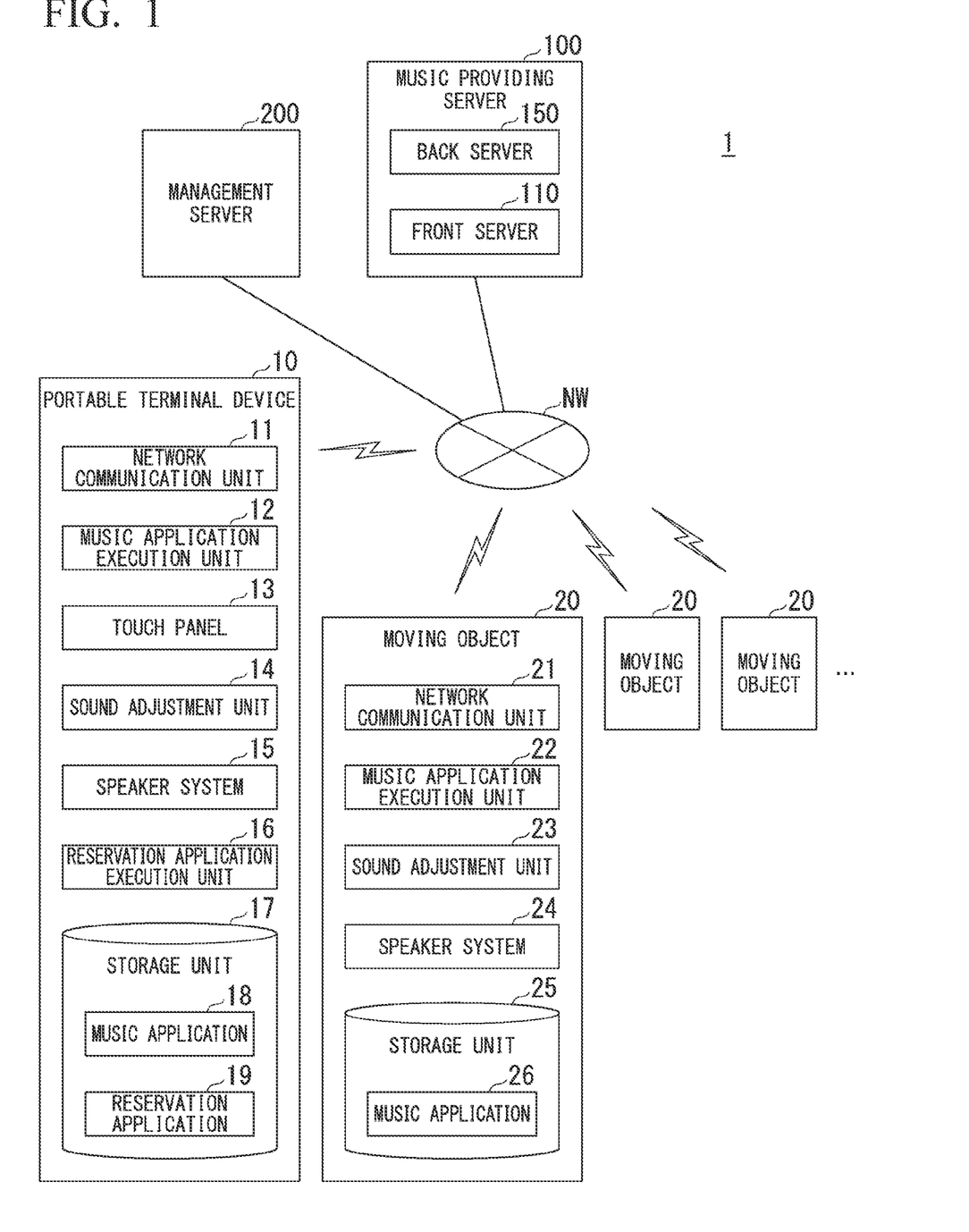
FIG. 1 is a configuration diagram of an information processing system using an information processing device of an embodiment.

FIG. 1 is a configuration diagram of an information processing system 1 using an information processing device of an embodiment. The information processing system 1 of the embodiment includes, for example, a portable terminal device 10, a plurality of shared moving objects 20, a music providing server 100, and a management server 200.

The information processing system 1 of the embodiment is a system that provides a user with information on a moving object that can be used by the user when the user moves for travel or the like. Further, the information processing system 1 of the embodiment is also a system that provides output content, for example, music, to the portable terminal device 10 and the shared moving objects 20. A piece of music is music, and may include an artist's song, performance, or program-reproduced music, as well as environmental sounds and the like. Examples of moving objects include vehicles with space for occupants to stay (such as four-wheeled or three-wheeled vehicles or micro mobility), ships, airplanes, two-wheeled vehicles, and the like. Examples of the shared moving objects 20 include moving objects such as electric trains used in public transportation or the like, coach buses, ships, airplanes, taxis, hired cars, rental cars, ride sharing, and vehicles used for car sharing (hereinafter referred to as shared vehicles).

Figure 2:
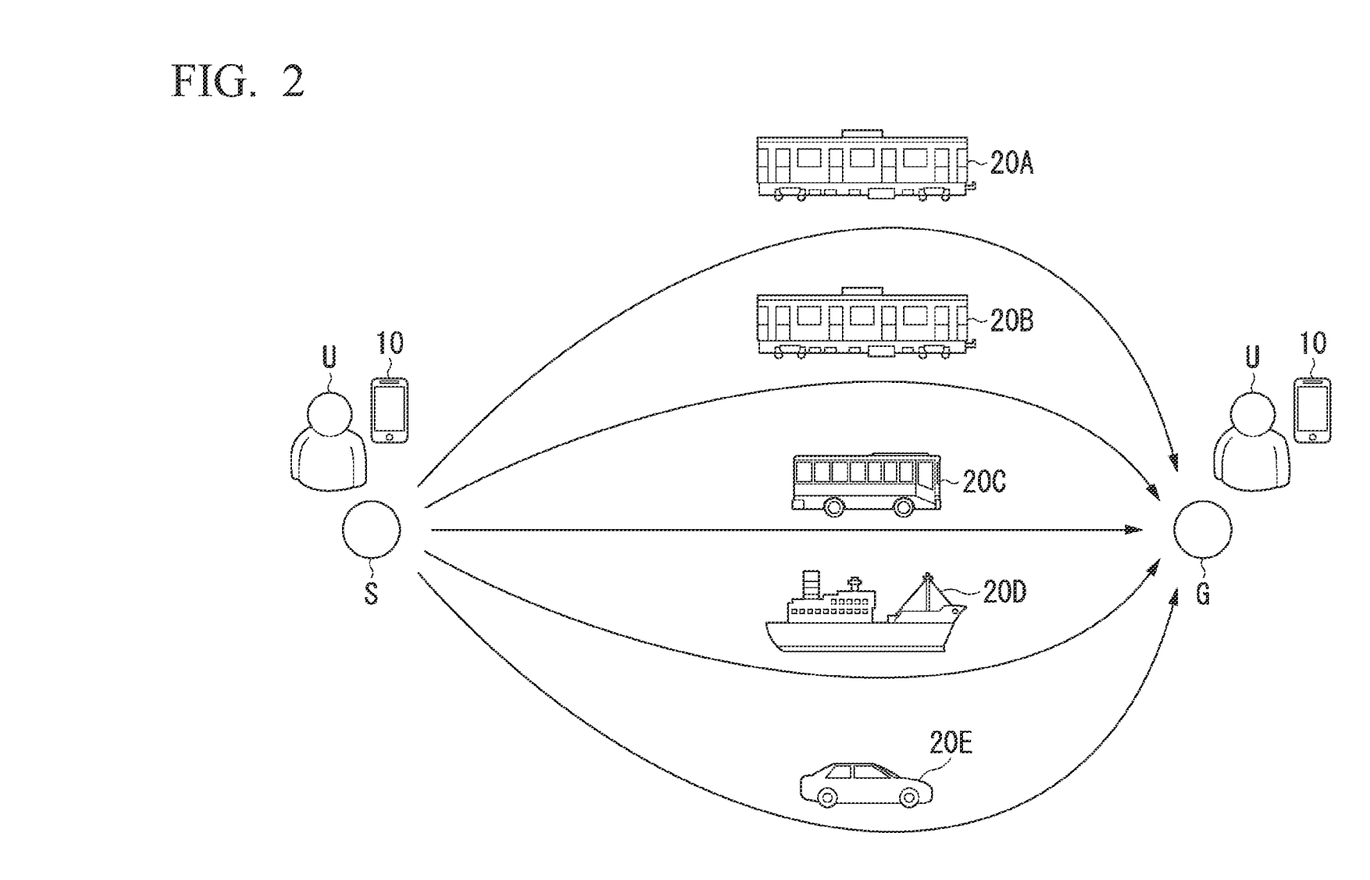
FIG. 2 is a diagram illustrating an example of a means of transportation for a user to move from a departure point to an arrival point.

FIG. 2 is a diagram illustrating an example of a means of transportation for a user U to move from a departure point S to an arrival point G. When the user U moves from the departure point S to the arrival point G, for example, a first route using a first train 20A, for example, a private train, a second route using a second train 20B, for example, a public train, a third route using a coach bus 20C, a fourth route using a ship 20D, and a fifth route using a shared vehicle 20E are assumed. The user U can select and use any of the first train 20A, the second train 20B, the coach bus 20C, the ship 20D, and the shared vehicle 20E as the shared moving object 20.

The portable terminal device 10 in the information processing system 1 is, for example, a portable computer device having a communication function, an input/output function, and an application execution function such as a smartphone or a tablet terminal. The portable terminal device 10 includes, for example, a network communication unit 11, a music application execution unit 12, a touch panel 13, a sound adjustment unit 14, a speaker system 15, a reservation application execution unit 16, and a storage unit 17.

The network communication unit 11 communicates with the management server 200 and the music providing server 100 through a network NW. The network NW includes a wireless base station, an access point, the Internet, a provider terminal, a wide area network (WAN), and the like.

The music application execution unit 12 functions by a processor such as a central processing unit (CPU) executing a music application 18 stored in the storage unit 17. The music application execution unit 12 controls each unit of the portable terminal device 10 in accordance with an input operation performed by the user U on the touch panel 13.

For example, in a case where the user U performs an input operation on a request to start listening to music, the music application execution unit 12 generates music request information and transmits the generated information to the music providing server 100. The music application 18 is, for example, installed in the portable terminal device 10 in advance from the server device of an application provider.

The sound adjustment unit 14 controls the speaker system 15. The speaker system 15 includes, for example, a plurality of speakers. The sound adjustment unit 14 may localize the sound image to any location by adjusting the sound volume of each of the plurality of speakers.

The reservation application execution unit 16 functions by a processor such as a CPU executing a reservation application 19 stored in the storage unit 17. The reservation application execution unit 16 controls each unit of the portable terminal device 10 in accordance with an input operation performed by the user U on the touch panel 13. For example, in a case where the user U performs an input operation on an application for use in which the user wants to reserve a shared moving object, the reservation application execution unit 16 generates reservation preparation request information indicating the application for use and transmits the generated information to the management server 200. The reservation preparation request information includes information such as, for example, a departure point, an arrival point, and a departure time.

The reservation application execution unit 16 acquires second information which is transmitted by the management server 200 and causes the touch panel 13 to display the acquired second information. The reservation application execution unit 16 generates reservation request information in accordance with an input operation performed by the user U on candidate information and transmits the generated information to the management server 200. The second information is data obtained by associating music with the shared moving object 20 and its operation time slot. The second information will be described later.

Each of the plurality of shared moving objects 20 includes, for example, a network communication unit 21, a music application execution unit 22, a sound adjustment unit 23, a speaker system 24, and a storage unit 25. The network communication unit 21 communicates with the management server 200 and the music providing server 100 through the network NW. The music application execution unit 22 functions by a processor such as a CPU executing a music application 26 stored in the storage unit 25. The sound adjustment unit 23 controls the speaker system 24. The speaker system 24 includes, for example, a plurality of speakers. The sound adjustment unit 23 may localize the sound image to any location by adjusting the sound volume of each of the plurality of speakers.

The shared moving object 20 including the sound adjustment unit 23 and the speaker system 24 may be some of the shared moving objects 20 that move integrally. For example, on a railroad having a plurality of railroad vehicles, each of the railroad vehicles may be provided with the sound adjustment unit 23 and the speaker system 24, and different music may be provided in each railroad vehicle.

Figure 3:
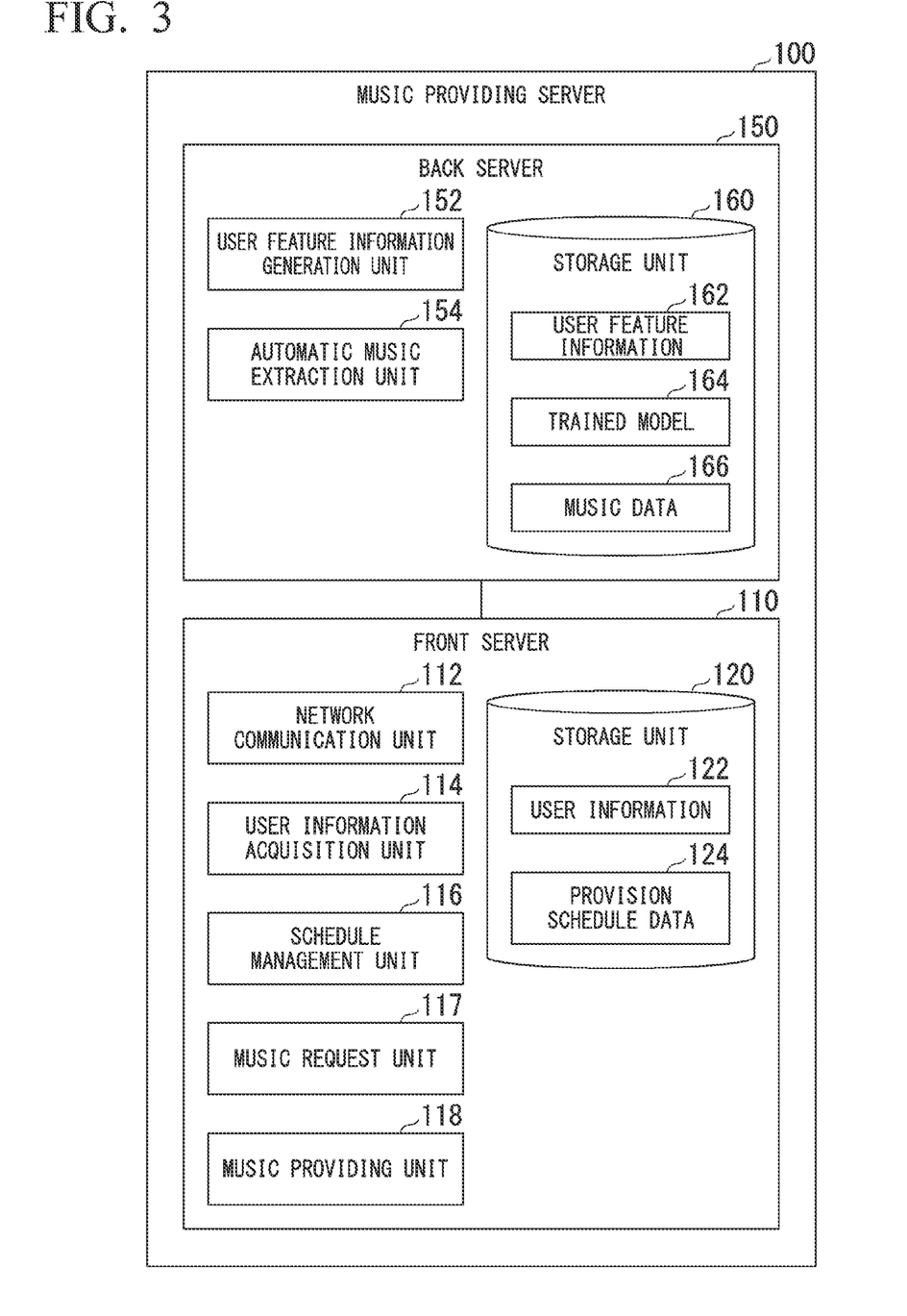
FIG. 3 is a configuration diagram of a music providing server.

FIG. 3 is a configuration diagram of the music providing server 100. The music providing server 100 includes, for example, a front server 110 and a back server 150. The front server 110 includes, for example, a network communication unit 112, a user information acquisition unit 114, a schedule management unit 116, a music request unit 117, a music providing unit 118, and a storage unit 120. Components other than the network communication unit 112 and the storage unit 120 are realized by a hardware processor such as, for example, a CPU executing a program (software). Some or all of these components may be realized by hardware (a circuit unit; including circuitry) such as an LSI, an ASIC, an FPGA, or a GPU, or may be realized by software and hardware in cooperation. The program may be stored in a storage device (a storage device including a non-transitory storage medium) such as an HDD or a flash memory in advance, may be stored in a detachable storage medium (non-transitory storage medium) such as a DVD or a CD-ROM, or may be installed by the storage medium being mounted in a drive device. The storage unit 120 stores information such as user information 122 and provision schedule data 124.

The back server 150 includes, for example, a user feature information generation unit 152, an automatic music extraction unit 154, and a storage unit 260. The user feature information generation unit 152 and the automatic music extraction unit 154 are realized by a hardware processor such as, for example, a CPU executing a program (software). Some or all of these components may be realized by hardware (a circuit unit; including circuitry) such as an LSI, an ASIC, an FPGA, or a GPU, or may be realized by software and hardware in cooperation. The program may be stored in a storage device (a storage device including a non-transitory storage medium) such as an HDD or a flash memory in advance, may be stored in a detachable storage medium (non-transitory storage medium) such as a DVD or a CD-ROM, or may be installed by the storage medium being mounted in a drive device. The storage unit 120 stores information such as user feature information 162, a trained model 164, and music data 166.

Figure 4:
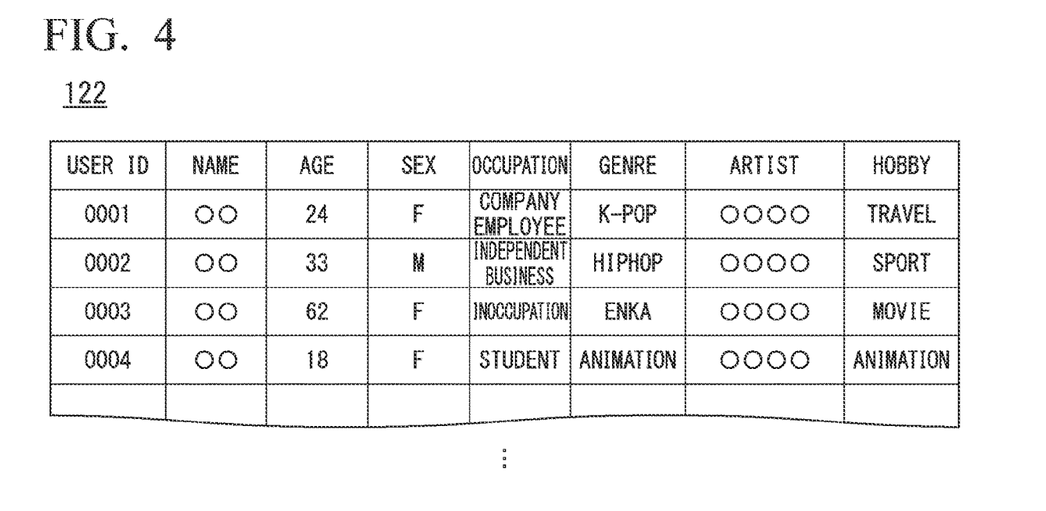
FIG. 4 is a diagram illustrating an example of content of user information.

FIG. 4 is a diagram illustrating an example of content of the user information 122. The user information 122 is, for example, information including name, age, sex, occupation, favorite music genre, favorite artist, hobby, and the like. The user information 122 is for example, information registered when a user starts using a service for receiving music provided by the music providing server 100.

Figure 5:
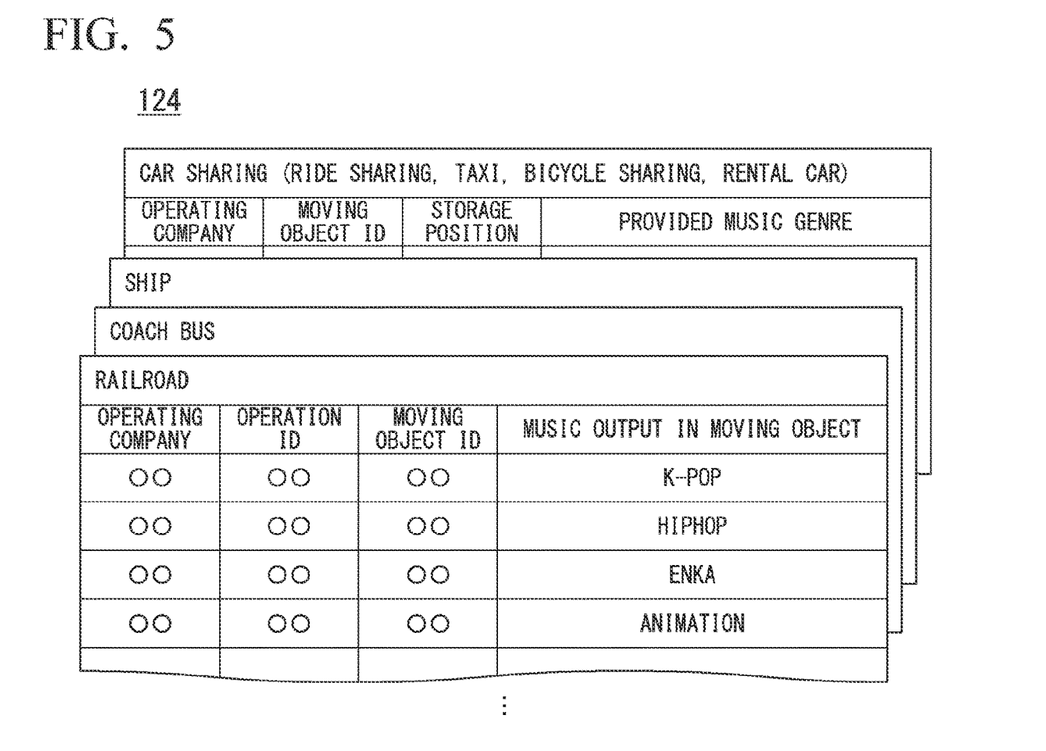
FIG. 5 is a diagram illustrating an example of content of provision schedule data.

FIG. 5 is a diagram illustrating an example of content of the provision schedule data 124. The provision schedule data 124 is information including a schedule of music which is provided by the music providing server 100 for each operation or vehicle of the shared moving object 20. The provision schedule data 124 in a case where the shared moving object 20 is a coach bus, a ship, or the like that operates regularly includes an operating company, an operation ID, a moving object ID, and music to be output in the shared moving object 20. The number of pieces of music to be output in the shared moving object 20 may be one or may be plural. In a case where there are a plurality of pieces of music, for example, the pieces of music may be set according to genre, artist, or the like.

The network communication unit 112 communicates with the portable terminal device 10, the shared moving object 20, and the management server 200 through the network NW. Meanwhile, communication between the front server 110 and the back server 150 may be performed through the same the network NW, or may be performed through a leased line, a local area network (LAN), a virtual private network (VPN), or the like.

The user information acquisition unit 114 acquires information on a user (user information) of the portable terminal device 10 and registers the acquired information in the user information 122. The user information is, for example, name, age, sex, occupation, favorite music, favorite artist, hobby, and the like. In addition to when the user starts using a service for receiving music provided by the music providing server 100, the user information acquisition unit 114 may be configured to be able to update the service during use.

The schedule management unit 116 manages a schedule when music is provided to the portable terminal device 10 and the shared moving object 20. The schedule management unit 116 extracts, for example, the provision schedule data 124 of the day before one day's business. The schedule management unit 116 refers to the extracted provision schedule data 124 to generate a first music request for music to be provided to each of the shared moving objects 20 and transmit the generated request to the back server 150. The schedule management unit 116 further transmits the extracted provision schedule data 124 to the management server 200.

The music request unit 117 generates a second music request on the basis of the music request information which is transmitted by the portable terminal device 10 and transmits the generated request to the back server 150. The second music request includes user information of the user U (from the viewpoint of personal information protection, processing such as deleting the name, changing the age to "30s" or the like, and changing the occupation from detailed information to "company employee" may be performed).

The music providing unit 118 further transmits first music data transmitted by the back server 150 to the shared moving object 20 and second music data to the portable terminal device 10. The shared moving object 20 causes the speaker system 24 to play back the transmitted first music data, and the portable terminal device 10 causes the speaker system 15 to play back the transmitted second music data. The front server 110 may have a function of holding the music data 166 and providing the first music data and the second music, or another server device may have that function.

The user feature information generation unit 152 generates user feature information in the format of a vector or the like on the basis of the user information included in the second music request. The generated user feature information may be stored in the storage unit 260 as the user feature information 162 in preparation for the second and subsequent second music requests related to the same the user U.

The automatic music extraction unit 154 extracts the first music data corresponding to the first music request from the music data 166. The automatic music extraction unit 154 inputs the user feature information corresponding to the second music request to the trained model 164 to extract the second music data matching the user from the music data 166. The automatic music extraction unit 154 transmits the extracted first music data and second music data to the front server 110.

The trained model 164 is trained using information obtained from results of a feedback experiment in advance as correct data. The trained model 164 is trained, for example, to select music actually highly evaluated by men in their 30s. The feedback experiment is, for example, a collection of feedback from the user U such as high evaluation, low evaluation, and playback of music provided through a music application 32.

Figure 6:
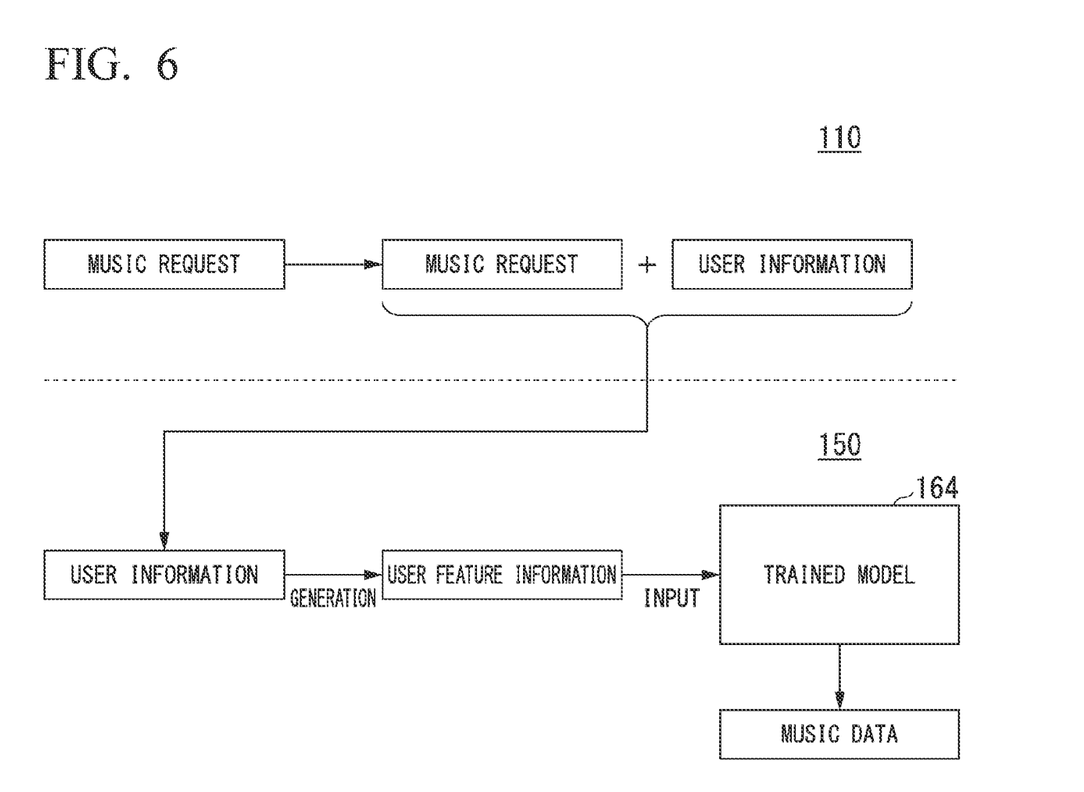
FIG. 6 is a diagram illustrating an outline of a flow of processing related to music recommendation.

FIG. 6 is a diagram illustrating an outline of a flow of processing related to music recommendation. When a music request is transmitted from the portable terminal device 10, the front server 110 imparts user information corresponding to the transmitted music request and transmits the imparted information to the back server 150. The back server 150 generates user feature information on the basis of the transmitted user information and inputs the generated information to the trained model 164. The back server 150 extracts the output data of the trained model 164 from the music data 166 as music data of music matching the user U.

Figure 7:
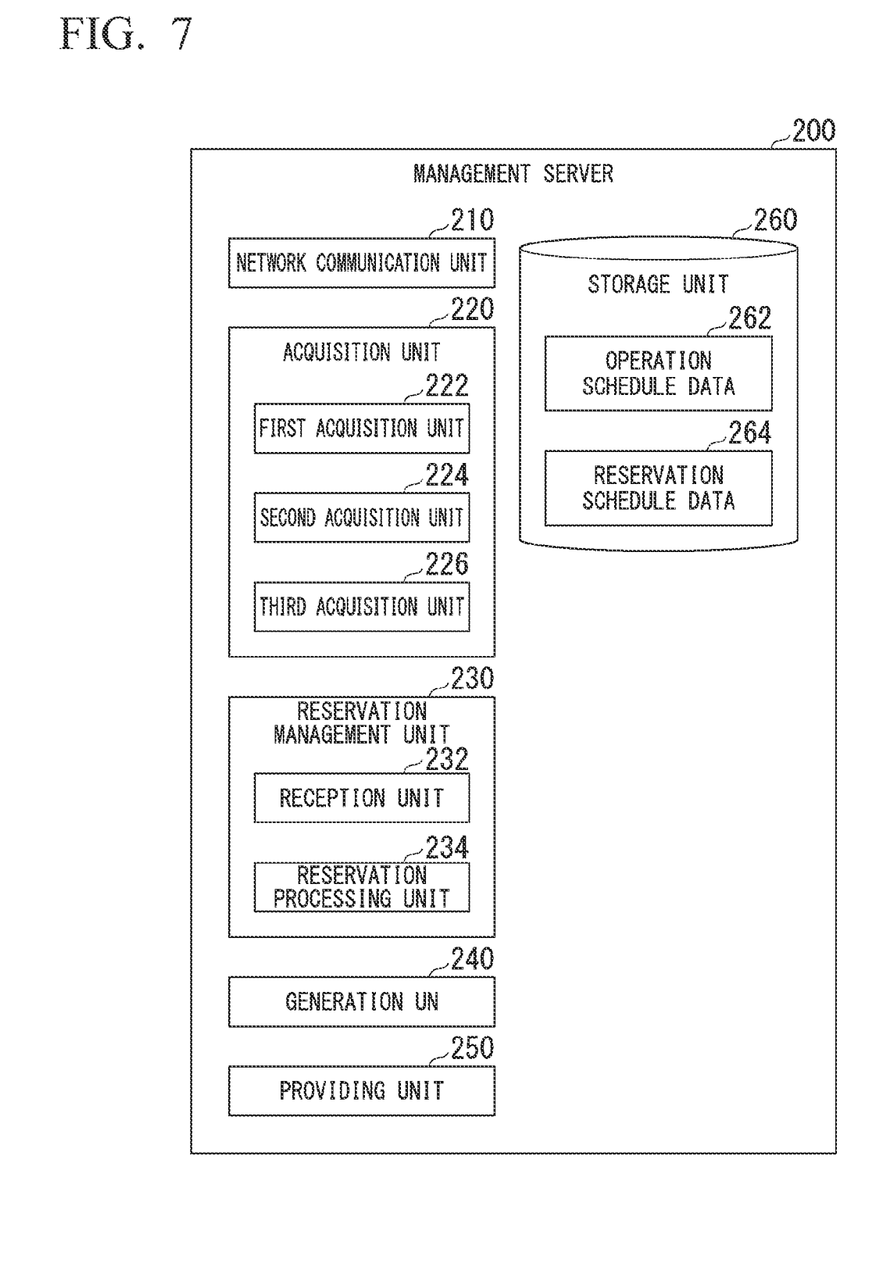
FIG. 7 is a configuration diagram of a management server.

FIG. 7 is a configuration diagram of the management server 200. The management server 200 includes, for example, a network communication unit 210, an acquisition unit 220, a reservation management unit 230, a generation unit 240, a providing unit 250, and the storage unit 260. Components other than the network communication unit 210 and the storage unit 260 are realized by a hardware processor such as, for example, a CPU executing a program (software). Some or all of these components may be realized by hardware (a circuit unit; including circuitry) such as a large-scale integration (LSI), an application specific integrated circuit (ASIC), a field-programmable gate array (FPGA), or a graphics processing unit (GPU), and may be realized by software and hardware in cooperation. The program may be stored in a storage device (a storage device including a non-transitory storage medium) such as a hard disk drive (HDD) or a flash memory in advance, may be stored in a detachable storage medium (non-transitory storage medium) such as a DVD or a CD-ROM, or may be installed by the storage medium being mounted in a drive device. The storage unit 260 stores information such as operation schedule data 262 and reservation schedule data 264.

Figure 8:
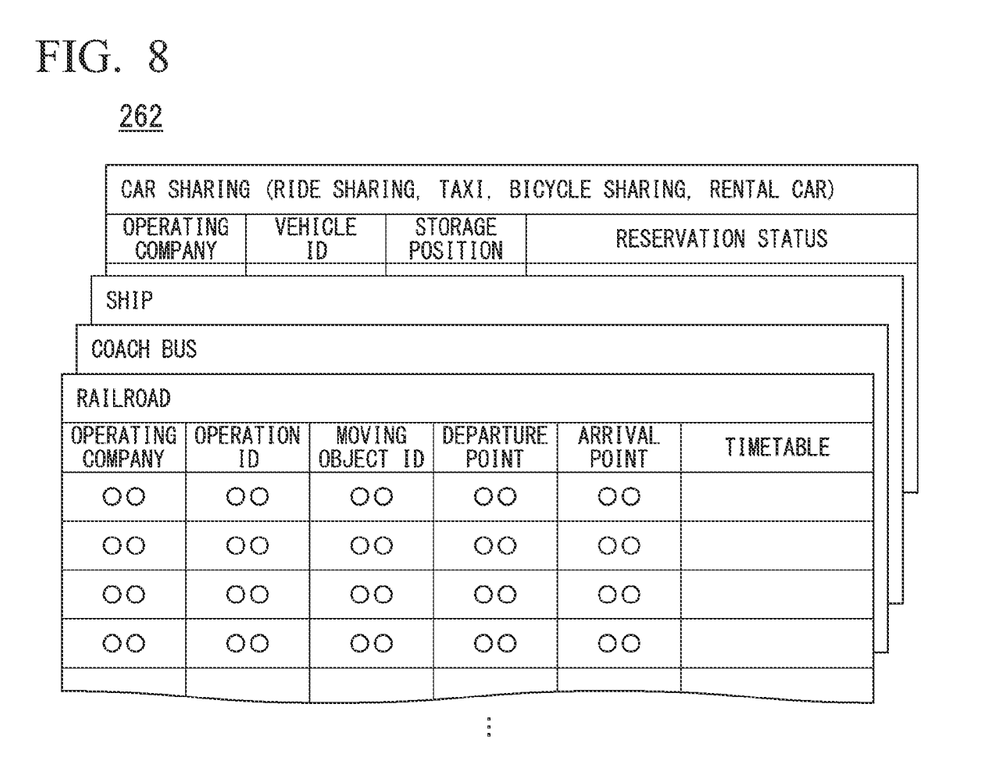
FIG. 8 is a diagram illustrating an example of content of operation schedule data.

FIG. 8 is a diagram illustrating an example of content of the operation schedule data 262. The operation schedule data 262 is data including various types of information for each of the shared moving objects 20. The operation schedule data 262 in a case where the shared moving object 20 is a train or the like that operates regularly includes data such as, for example, an operating company, an operation ID, a moving object ID, a departure point, a destination, a timetable, and the like.

The operation ID is an ID imparted to each operation from a departure point to a destination. The vehicle ID is an ID imparted to each shared moving object 20 (shared car). In addition, the operation schedule data 262 in a case where the shared moving object 20 is used by the user U alone or in a small number of shared moving objects, such as car sharing, includes, for example, data such as an operating company, a vehicle ID, a storage position, a reservation status, and the like.

Figure 9:
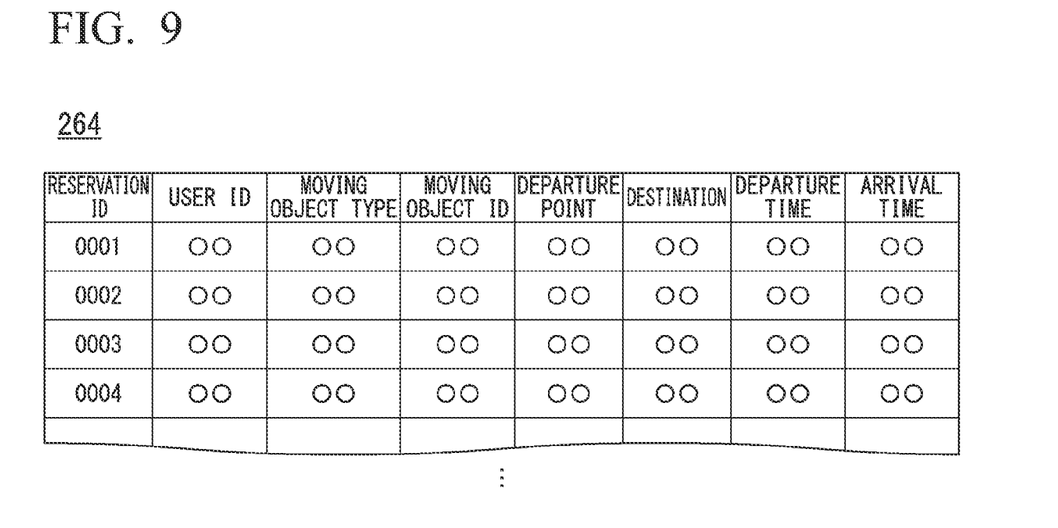
FIG. 9 is a diagram illustrating an example of content of reservation schedule data.

FIG. 9 is a diagram illustrating an example of content of the reservation schedule data 264. The reservation schedule data 264 includes data on the reservation status of the shared moving object 20 of the user U. The reservation schedule data 264 includes data such as, for example, a reservation ID, a user ID, a moving object type, a moving object ID, a departure point, a destination, a departure time, an arrival time, and the like.

The network communication unit 210 communicates with the portable terminal device 10, the shared moving object 20, and the music providing server 100 through the network NW.

The acquisition unit 220 includes, for example, a first acquisition unit 222, a second acquisition unit 224, and a third acquisition unit 226. The first acquisition unit 222 acquires information on music which is output by a plurality of shared moving objects used by a plurality of users (hereinafter referred to as first information) on the basis of the provision schedule data 124 transmitted by the schedule management unit 116 of the music providing server 100.

The second acquisition unit 224 acquires an action schedule of the user U who has transmitted the reservation preparation request information on the basis of the reservation preparation request information transmitted by the portable terminal device 10. The action schedule of the user U includes information on the user ID of the user U, and a departure point, a destination (arrival point), and a departure time when the user U moves. The third acquisition unit 226 acquires a movement schedule of the shared moving object 20 on the basis of the operation schedule data 262 stored in the storage unit 260.

The reservation management unit 230 includes, for example, a reception unit 232 and a reservation processing unit 234. The reception unit 232 receives the reservation request information transmitted by the portable terminal device 10. The reservation processing unit 234 specifies a shared moving object 20 for which the user U wishes to make a reservation and its operation time slot on the basis of the reservation request information received by the reception unit 232.

The reservation processing unit 234 specifies a shared moving object 20 of which the movement schedule matches the action schedule of the user U (hereinafter referred to as a target moving object) on the basis of the action schedule of the user U acquired by the second acquisition unit 224 and the movement schedule of the shared moving object 20 acquired by the third acquisition unit 226. The target moving object is, for example, a shared moving object 20 that can be used for movement from a departure point to a destination at a time specified on the basis of the reservation preparation request information acquired by the second acquisition unit 224. The reservation processing unit 234 generates second information obtained by associating the first information acquired by the first acquisition unit 222 with the shared moving object for which the user U wishes to make a reservation and the shared moving object 20 of an operation time slot excluding already reserved data in its operation time slot.

The second information is data including information on music data and information on the shared moving object 20 and its operation time slot and indicating music which is output by the shared moving object 20 in the operation time slot. The operation time slot is, for example, a time slot from the departure time of the shared moving object and its arrival time. The departure time and arrival time here may be an actual time or may be a scheduled time.

In a case where the reception unit 232 receives the reservation request information transmitted by the portable terminal device 10, the reservation processing unit 234 completes the reservation processing corresponding to the reservation request information. After the reservation processing is completed, the reservation processing unit 234 updates the reservation schedule data 264 by adding the content of reservation request information.

The generation unit 240 generates third information after the reservation processing is completed by the reservation processing unit 234. The third information is information on music (hereinafter referred to as pre-use music) for causing the portable terminal device 10 to output music (hereinafter referred to as specific music) which is related to music to be output by the shared moving object 20 used by the user U according to the reservation request information and is different from the music before the user U uses the shared moving object 20. The specific music is an example of specific output content.

The specific music may be, for example, music which is completely unrelated to music output by the shared moving object 20 (hereinafter referred to as output music), or may be music which is closely related to the output music. For example, in a case where the output music is classical music, the specific music may be pop music, rock music, or the like which is unrelated to classical music. Alternatively, in a case where the output music is the second movement of a certain piece of music, the specific music may be the first movement of the certain piece of music which is closely related to the second movement of the certain piece of music. The third information includes, for example, the user ID and operation ID of the user U according to the reservation request information.

The providing unit 250 provides the second information to the user U of the portable terminal device 10 by transmitting the second information generated by the reservation processing unit 234 to the portable terminal device 10 that has transmitted the reservation preparation request information. Further, the providing unit 250 transmits reservation completion information indicating that the reservation has been completed by the reservation processing unit 234 to the portable terminal device 10, and provides the transmitted information to the user U of the portable terminal device 10.

The providing unit 250 transmits the third information generated by the generation unit 240 to the music providing server 100. In the automatic music extraction unit 154, the music providing server 100 that has transmitted the third information refers to the provision schedule data 124 for the user ID and the operation ID included in the third information to specify music which is provided by the shared moving object 20 used by the user U.

In this case, the automatic music extraction unit 154 extracts music excluding the specified music. The music to be extracted here may be, for example, determined randomly, or in a case where the output data of the trained model 164 is extracted and then the music is specified, the output data may be extracted again, and this operation may be repeated until music other than the specified music is extracted.

Figure 10:
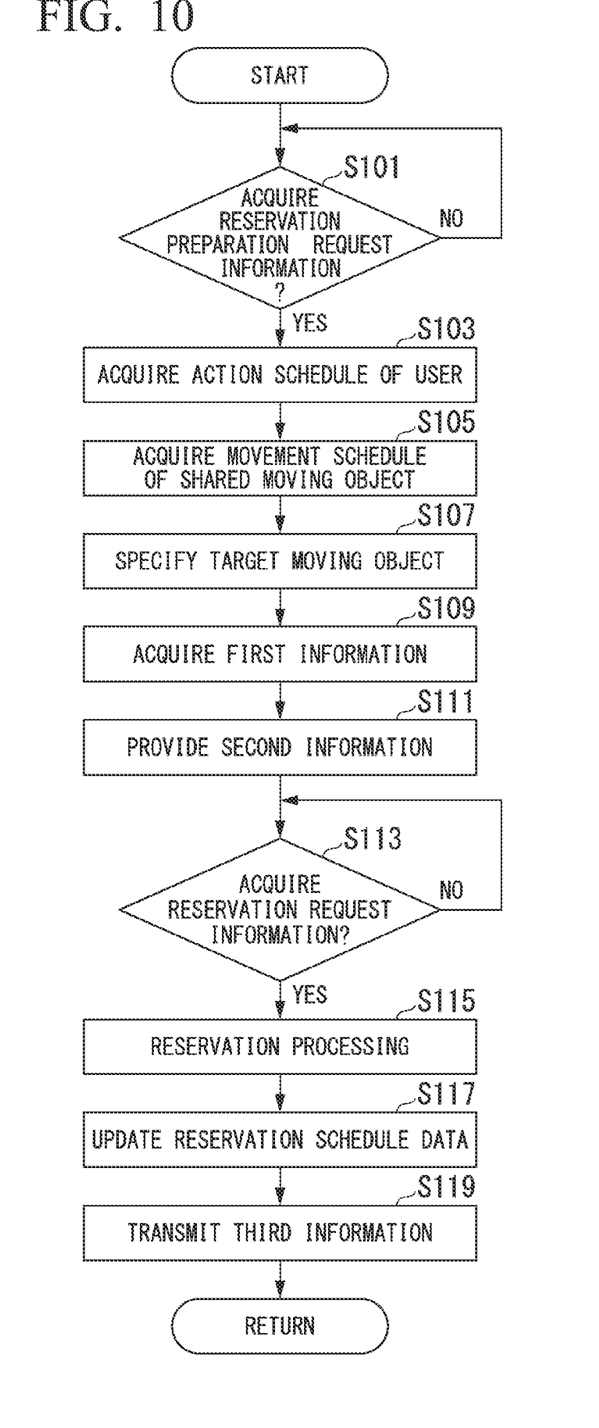
FIG. 10 is a flowchart illustrating an example of processing of the management server.

Next, processing in the management server 200 will be described. FIG. 10 is a flowchart illustrating an example of processing of the management server 200. The management server 200 starts one routine of processing shown in FIG. 10 upon receiving the reservation preparation request information transmitted by the portable terminal device 10. The management server 200 first determines whether the reservation preparation request information transmitted by the portable terminal device 10 has been acquired by the second acquisition unit 224 in the reception unit 232 (step S101).

In a case where it is determined that the reservation preparation request information has not been received by the second acquisition unit 224, the reception unit 232 repeats the process of step S101. In a case where it is determined that the reservation preparation request information has been received, the second acquisition unit 224 acquires the action schedule of the user U on the basis of the acquired reservation preparation request information (step S103).

Next, the third acquisition unit 226 acquires the movement schedule of each of the plurality of shared moving objects 20 on the basis of the operation schedule data 262 stored in the storage unit 260 (step S105). Subsequently, the reservation processing unit 234 specifies a target moving object on the basis of the action schedule of the user U acquired by the second acquisition unit 224 and the movement schedule of the plurality of shared moving objects 20 acquired by the third acquisition unit 226 (step S107).

Next, the first acquisition unit 222 acquires the first information on the basis of the provision schedule data 124 transmitted by the schedule management unit 116 of the music providing server 100 (step S109). Subsequently, the reservation processing unit 234 generates the second information by associating the first information acquired by the first acquisition unit 222 in step S109 with each of the target moving objects specified in step S107. Subsequently, the providing unit 250 transmits and provides the second information generated by the reservation processing unit 234 to the portable terminal device 10 of the user U who has transmitted the reservation preparation request information (step S111). The second information transmitted to the portable terminal device 10 is displayed, for example, on the touch panel 13 of the portable terminal device 10 in which the reservation application execution unit 16 is running the reservation application 19.

Next, the reception unit 232 determines whether the reservation request information transmitted by the portable terminal device 10 has been acquired (step S113). In a case where it is determined that the reservation request information has not been acquired, the reception unit 232 repeats the process of step S113. In a case where it is determined that the reservation request information has been acquired, the reservation processing unit 234 executes the reservation processing (step S115) and updates the reservation schedule data 264 (step S117).

Next, the generation unit 240 generates the third information. The providing unit 250 transmits the third information generated by the generation unit 240 to the music providing server 100 (step S119). The music providing server 100 extracts music data according to the third information and transmits the extracted music data to the portable terminal device 10. Thus, the management server 200 ends one routine of the processing shown in FIG. 10.

Figure 11:
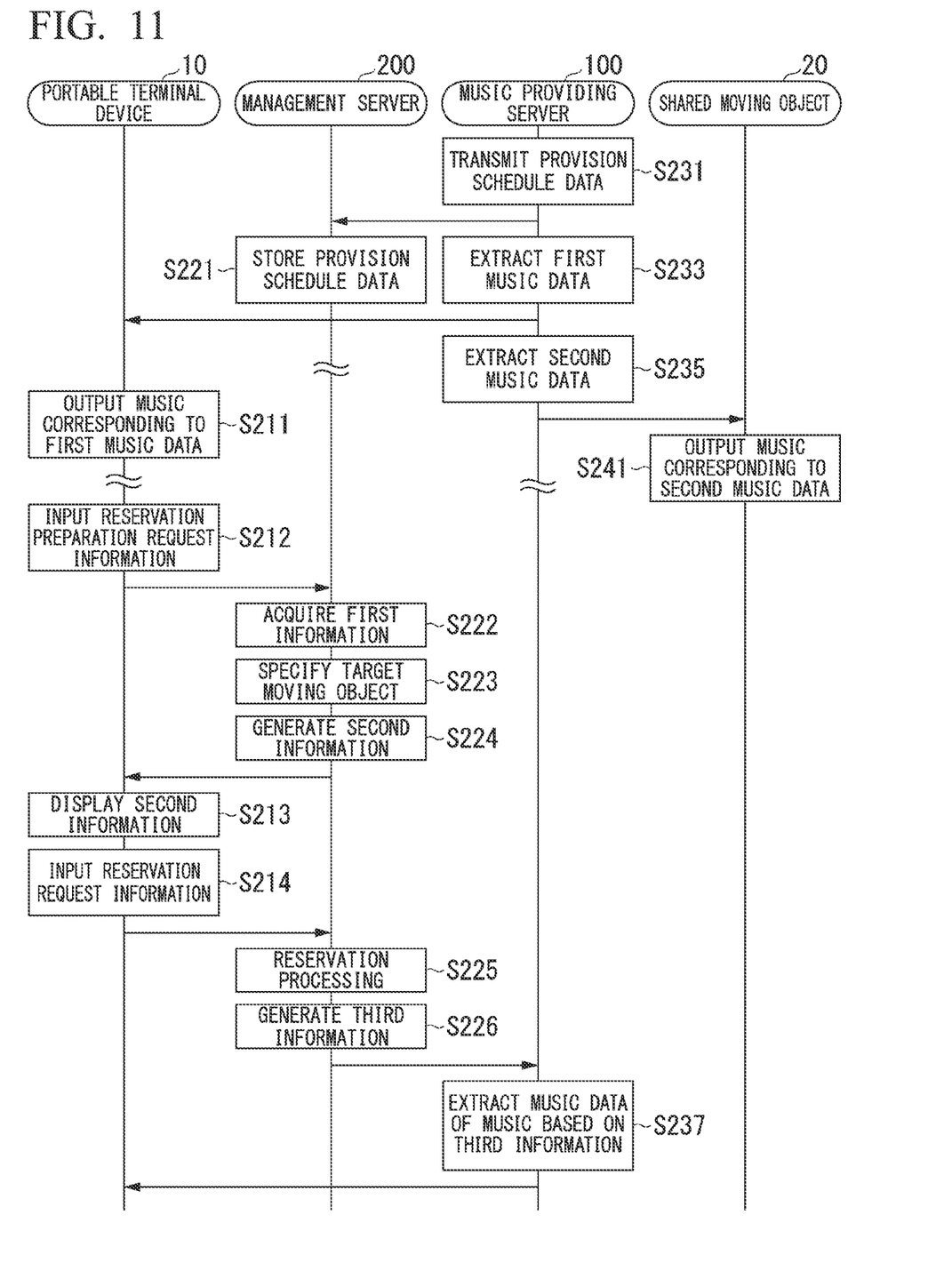
FIG. 11 is a sequence diagram illustrating an example of a flow of information in the information processing system.

Next, a flow of information in the information processing system 1 will be described. FIG. 11 is a sequence diagram illustrating an example of a flow of information in the information processing system 1. First, the music providing server 100 transmits the provision schedule data 124 stored in the storage unit 120 to the management server 200, for example, at the beginning of one day (step S231). The management server 200 stores the transmitted provision schedule data 124 in the storage unit 260 (step S221).

In a case where the music request information is transmitted by the portable terminal device 10, the music providing server 100 generates the first music data (step S233) and transmits the generated data to the portable terminal device 10. The portable terminal device 10 outputs music of the transmitted first music data through the speaker system 15 (step S211).

The music providing server 100 refers to the provision schedule data 124 stored in the storage unit 120 to generate the second music data (step S235) and transmit the generated data to the shared moving object 20 in the operation time slot of the shared moving object 20. The shared moving object outputs music of the transmitted second music data through the speaker system 24 (step S241). The processing up to this point is executed regardless of whether the user U uses the shared moving object 20.

When the user U intends to use the shared moving object 20 and inputs the reservation preparation request information by performing an input operation on the portable terminal device 10 (step S212), the portable terminal device 10 transmits the input reservation preparation request information to the management server 200. The management server 200 to which the reservation preparation request information has been transmitted refers to the provision schedule data 124 stored in the storage unit 260 for the transmitted reservation preparation request information in the first acquisition unit 222, and acquires the first information (step S222).

Next, in the reservation processing unit 234, the management server 200 specifies a target moving object on the basis of the schedule information of the user U and the schedule information of the shared moving object 20 (step S223). Subsequently, in the reservation processing unit 234, the management server 200 generates the second information obtained by associating the first information with the shared moving object 20 (step S224). In the providing unit 250, the management server 200 transmits the second information generated by the reservation processing unit 234 to the portable terminal device 10.

The portable terminal device 10 causes the touch panel 13 to display the second information including the transmitted information of the plurality of shared moving objects 20

Figure 12:
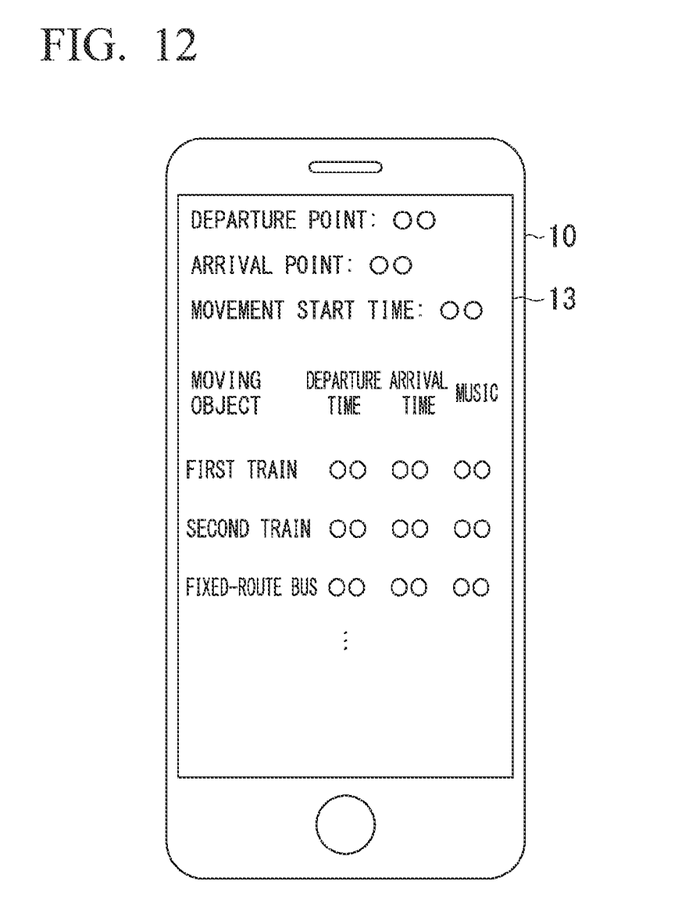
FIG. 12 is a diagram illustrating an example of a screen of a touch panel of a portable terminal device on which second information is displayed.

(step S213). FIG. 12 is a diagram illustrating an example of a screen of the touch panel 13 of the portable terminal device 10 on which the second information is displayed. The touch panel 13 displays, as the second information, the departure point, arrival point, and movement start time designated by the user U, the type, departure time, and arrival time of the target moving object, and music to be output in the target moving object.

The user U who looks at the touch panel 13 selects a favorite target moving object and performs an input operation for designating the selected target moving object. Subsequently, when the reservation request information is input to the portable terminal device 10 through the input operation of the user U (step S214), the portable terminal device 10 transmits the input reservation request information to the management server 200.

The management server 200 that has received the reservation request information receives the reservation request information in the reception unit 232. Subsequently, the management server 200 performs the reservation processing in the reservation processing unit 234 (step S225) and updates the reservation schedule data 264. Upon the completion of the reservation processing, the reservation processing unit 234 transmits the reservation completion information to the portable terminal device 10. Subsequently, the management server 200 generates the third information in the generation unit 240 (step S226) and transmits the generated information to the music providing server 100.

The music providing server 100 that has received the third information extracts music data of the pre-use music which is related to the specific music to be output by the shared moving object 20 used by the user U and is different from the specific music on the basis of the transmitted third information (step S237). The music providing server 100 transmits the extracted music data to the portable terminal device 10. The portable terminal device 10 that has transmitted the music data outputs the output music of the transmitted music data through the speaker system 24 before the user U uses the shared moving object 20.

The information processing system 1 of the embodiment provides the portable terminal device 10 of the user U with the second information obtained by associating the first information on the music output by each of the plurality of shared moving objects 20 with the shared moving object. Therefore, the user U can select a moving object to be used according to the music to be output in the moving object. Therefore, it is possible to provide content adapted to the user's preference in the shared moving object 20.

In addition, the pre-use music output by the portable terminal device 10 before the user U uses the shared moving object 20 becomes specific music which is related to the output music to be output by the shared moving object 20 used by the user U and is different from the output music. For example, in a case where the pre-use music is specific music which is unrelated to the output music, the user U can be allowed to listen to fresh music when the shared moving object 20 is used. In addition, in a case where the pre-use music is music which is closely related to the output music, it is possible to enhance the mood of the user U who listens to the output music when the shared moving object 20 is used.

In the above embodiment, the output content is music, but the output content may be audio other than music, for example, recitation, rakugo, storytelling, comic dialogue, and the like, or may be output content other than audio, for example, content based on video. In a case where the output content is video, the output content may be displayed, for example, on a display.

The above-described embodiment can be represented as follows.

An information processing device including:
  a storage medium that stores computer-readable instructions; and
  a processor connected to the storage medium,
  wherein the processor executes the computer-readable instructions, to thereby
  acquire first information of output content to be output by each of a plurality of shared moving objects used by a plurality of users,
  provide second information obtained by associating the first information with the shared moving object to a terminal device of the user, and
  receive an application for use of the shared moving object which is transmitted by the terminal device.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information processing device comprising:
  a processor configured to
  acquire first information of output content to be output by each of a plurality of shared moving objects used by a plurality of users;
  provide second information obtained by associating the first information with the shared moving object to a terminal device of the user; and
  receive an application for use of the shared moving object which is transmitted by the terminal device,
  wherein the processor is further configured to cause the terminal device to output specific output content before the user uses the shared moving object, the specific output content being a same genre as the output content to be output by the shared moving object used by the user and being different from the output content to be output by the shared moving object used by the user.

2. The information processing device according to claim 1, wherein the processor is further configured to:
  acquire an action schedule of the user; and
  acquire a movement schedule of the plurality of shared moving objects,
  provide the terminal device with the second information of the shared moving objects of which the movement schedule matches the action schedule of the user.

3. An information processing method comprising causing a computer to:
  acquire first information of output content to be output by each of a plurality of shared moving objects used by a plurality of users;
  provide second information obtained by associating the first information with the shared moving object to a terminal device of the user;
  receive an application for use of the shared moving object which is transmitted by the terminal device; and
  cause the terminal device to output specific output content before the user uses the shared moving object, the specific output content being a same genre as the output content to be output by the shared moving object used by the user and being different from the output content to be output by the shared moving object used by the user.

4. A non-transitory storage medium having computer-readable instructions stored therein for causing a computer to:
acquire first information of output content to be output by each of a plurality of shared moving objects used by a plurality of users;
provide second information obtained by associating the first information with the shared moving object to a terminal device of the user;
receive an application for use of the shared moving object which is transmitted by the terminal device; and
cause the terminal device to output specific output content before the user uses the shared moving object, the specific output content being a same genre as the output content to be output by the shared moving object used by the user and being different from the output content to be output by the shared moving object used by the user.

5. An information processing device comprising:
a processor configured to;
acquire first information of output content to be output by each of a plurality of shared moving objects used by a plurality of users;
provide second information obtained by associating the first information with the shared moving object to a terminal device of the user; and
receive an application for use of the shared moving object which is transmitted by the terminal device,
wherein the processor is further configured to cause the terminal device to output specific output content content before the user uses the shared moving object, the specific output content being a different genre from output content to be output by the shared moving object used by the user and being different from the output content to be output by the shared moving object used by the user.

6. An information processing method comprising causing a computer to:
acquire first information of output content to be output by each of a plurality of shared moving objects used by a plurality of users;
provide second information obtained by associating the first information with the shared moving object to a terminal device of the user;
receive an application for use of the shared moving object which is transmitted by the terminal device; and
cause the terminal device to output specific output content before the user uses the shared moving object, the specific output content being a different genre from output content to be output by the shared moving object used by the user and being different from the output content to be output by the shared moving object used by the user.

7. A non-transitory storage medium having computer-readable instructions stored therein for causing a computer to:
acquire first information of output content to be output by each of a plurality of shared moving objects used by a plurality of users;
provide second information obtained by associating the first information with the shared moving object to a terminal device of the user;
receive an application for use of the shared moving object which is transmitted by the terminal device; and
cause the terminal device to output specific output content before the user uses the shared moving object, the specific content being a different genre from output content to be output by the shared moving object used by the user and being different from the output content to be output by the shared moving object used by the user.

* * * * *